Jan. 16, 1962   J. R. HOMAN   3,017,553
DYNAMOELECTRIC APPARATUS
Filed Aug. 17, 1959   4 Sheets-Sheet 1
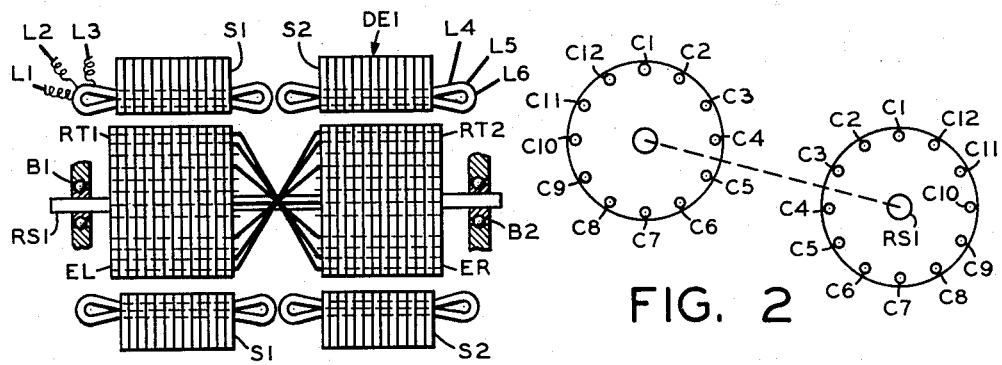
FIG. 1
FIG. 2
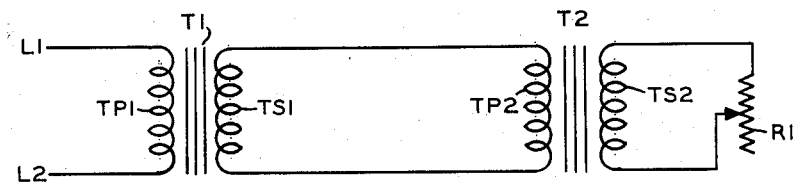
FIG. 3
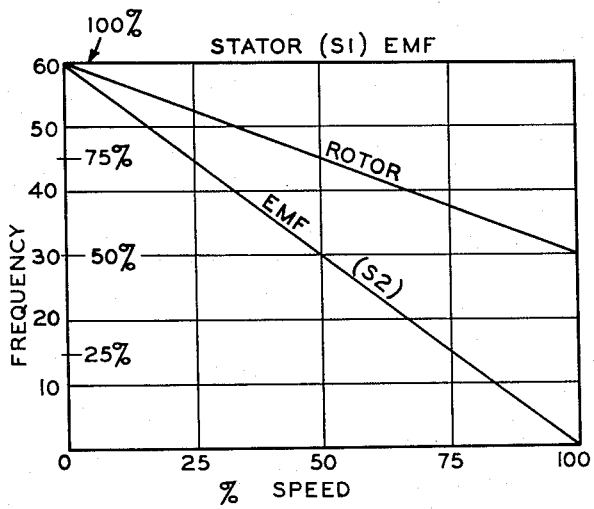
FIG. 4
Jack R. Homan,
Inventor.
Koenig and Pope,
Attorneys.

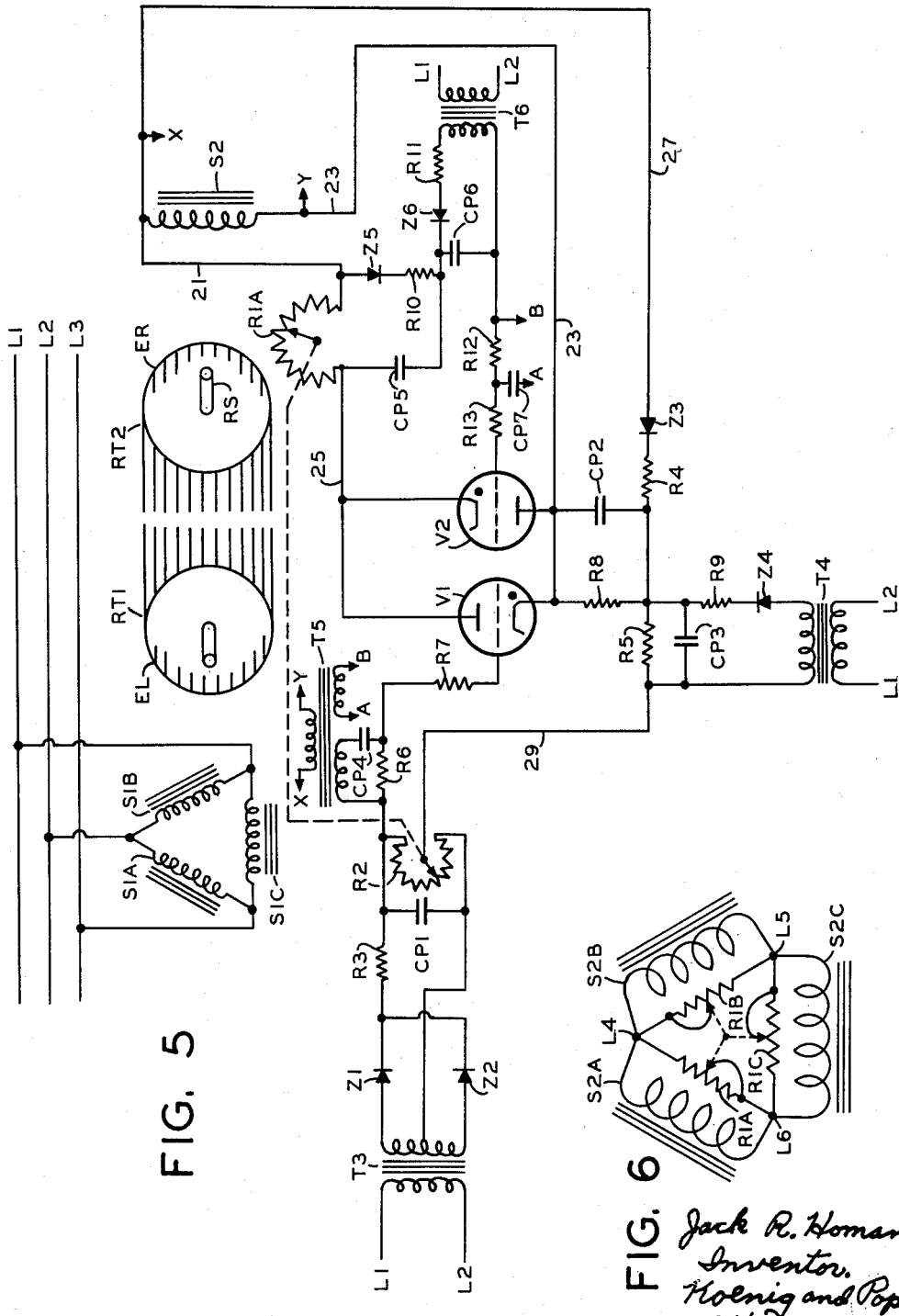

Jan. 16, 1962 J. R. HOMAN 3,017,553
DYNAMOELECTRIC APPARATUS
Filed Aug. 17, 1959 4 Sheets-Sheet 3
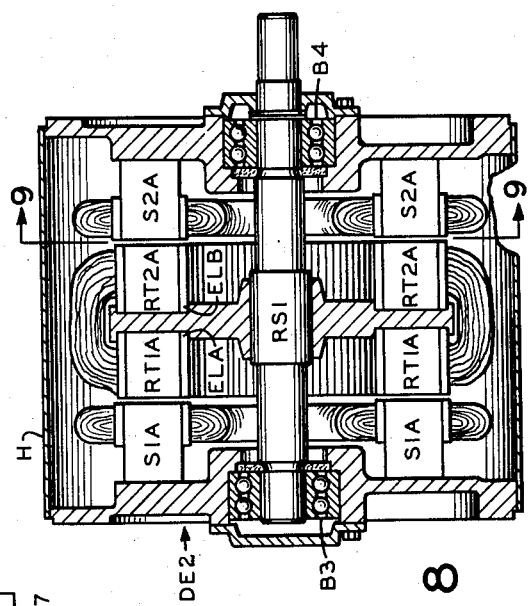
FIG. 8
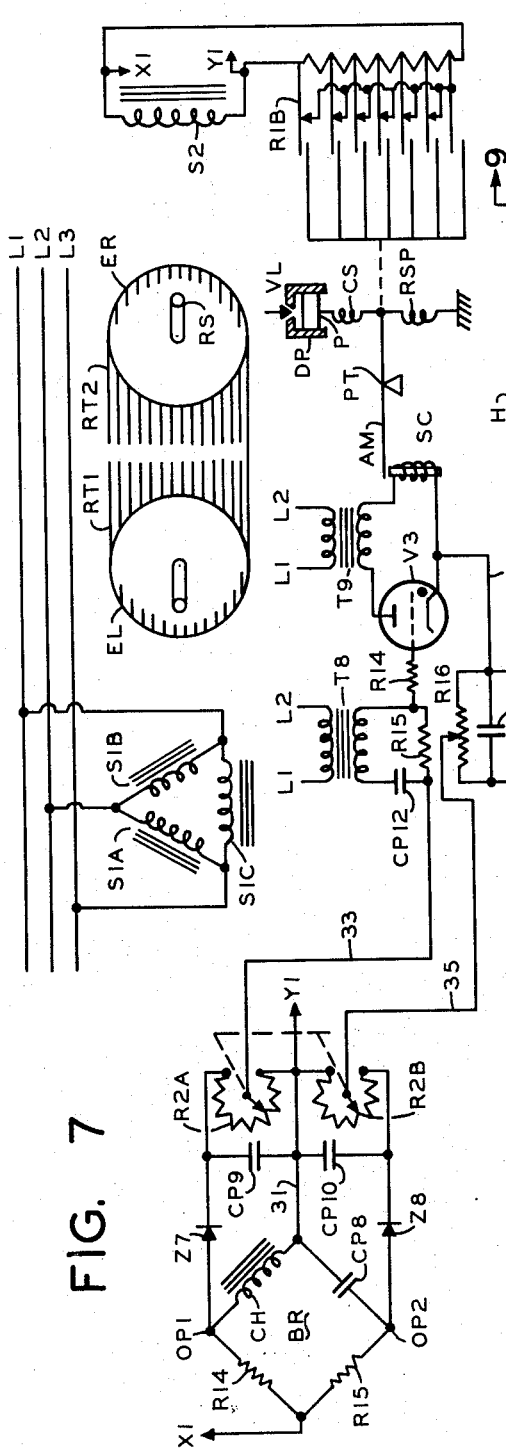
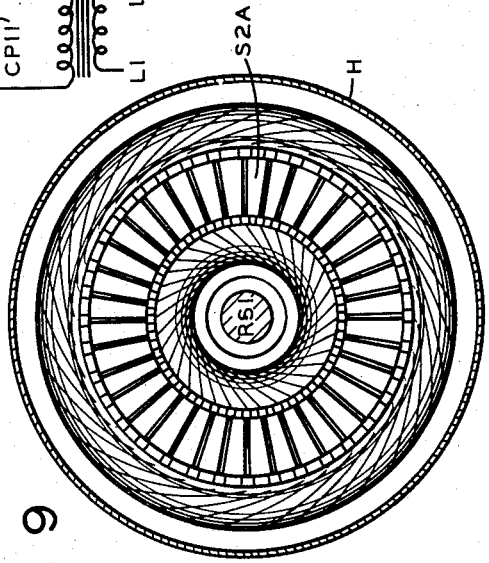
FIG. 9
Jack R. Homan,
Inventor.
Koenig and Pope,
Attorneys.

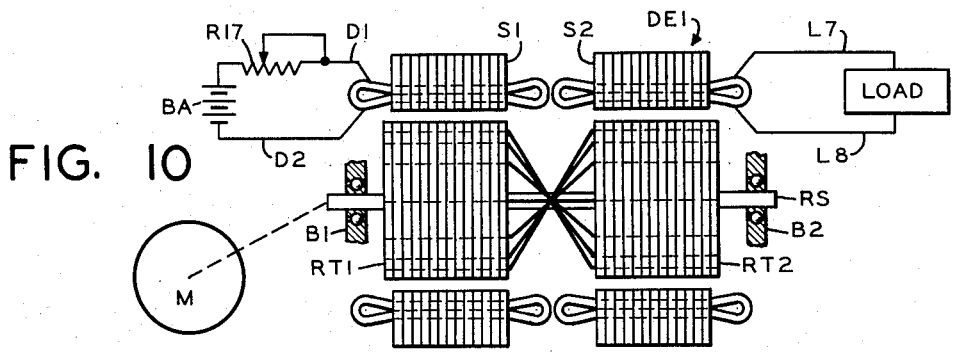
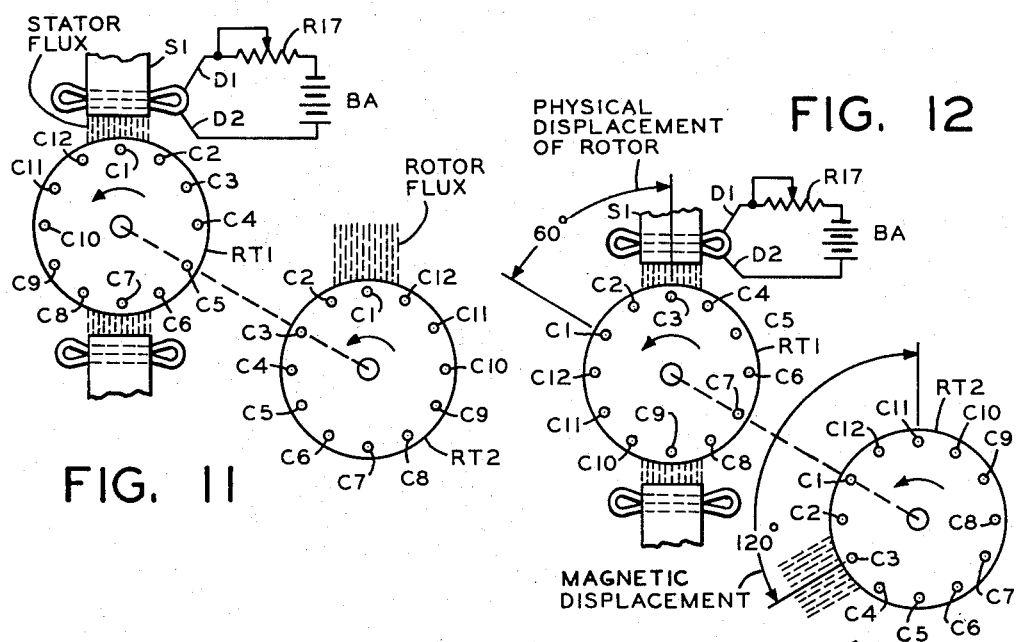
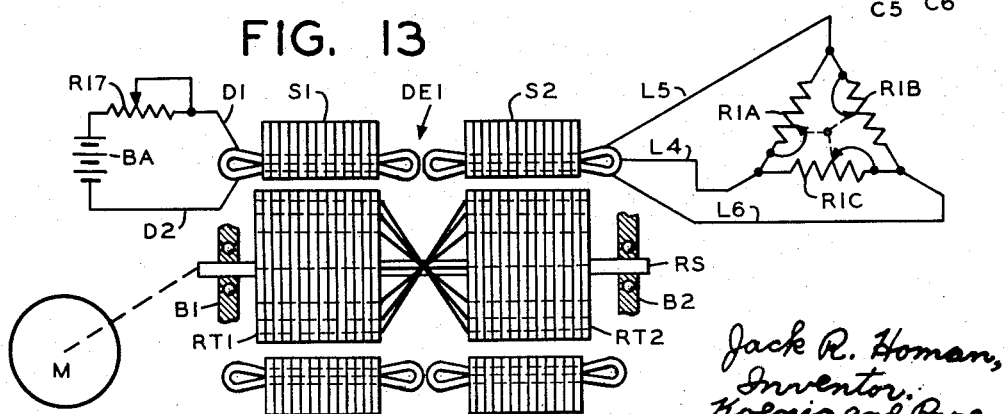

United States Patent Office 3,017,553
Patented Jan. 16, 1962

3,017,553
DYNAMOELECTRIC APPARATUS
Jack R. Homan, 35 Pleasant Hill Blvd., Palatine, Ill.
Filed Aug. 17, 1959, Ser. No. 834,301
15 Claims. (Cl. 318—199)

This invention relates to dynamoelectric apparatus and more particularly to such apparatus which will operate as a variable speed motor, a generator, or a brake.

Among the several objects of the invention may be noted the provision of dynamoelectric apparatus that will operate efficiently as a variable speed A.C. motor, generator or brake without the use of slip rings or commutators; the provision of such an A.C. motor which will exert torque at zero speed and which has a wide range of speeds at which it may be operated; the provision of A.C. motor apparatus of the class described in which the motor speed can be adjusted and maintained within close tolerances at any of a wide range of predetermined speeds under changing load conditions; and the provision of dynamoelectric apparatus which is relatively compact in size, economical to construct, and reliable and efficient in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a schematic representation of one embodiment of dynamoelectric apparatus of the present invention;

FIG. 2 is a perspective view of the end rings of the rotor component of the apparatus of FIG. 1;

FIG. 3 is a diagram of an analogous electrical circuit used to explain the theory of operation of the present invention;

FIG. 4 is a graph of certain operating characteristics of apparatus of the present invention and their interrelationships;

FIG. 5 is a circuit diagram of one embodiment of a variable speed motor control apparatus of the present invention;

FIG. 6 illustrates a stator winding-rheostat component of this invention;

FIG. 7 is a circuit diagram of another variable speed motor-speed control apparatus of the present invention;

FIG. 8 is a side elevation of another embodiment of dynamoelectric apparatus of this invention with parts broken away;

FIG. 9 is a cross section taken on line 9—9 of FIG. 8;

FIG. 10 is a schematic representation of dynamoelectric apparatus of the present invention operating as an A.C. generator;

FIGS. 11 and 12 are diagrammatic views of a rotor structure of dynamoelectric apparatus of the present invention showing electrical and physical interrelationships in two rotationally displaced exemplary positions of the rotor; and, FIG. 13 is a schematic representation of dynamoelectric apparatus of the present invention operating as an adjustable brake.

Corresponding reference characters indicate corresponding parts throughout the several views of the drawings.

In providing variable speed operation of an A.C. induction motor, it has been customary to use a wound rotor instead of the squirrel-cage type rotor, and by means of slip rings and associated brushes to connect the wound rotor windings to external heat dissipating resistors, which are adjusted to vary the motor speed. This arrangement has a number of serious disadvantages, including the need for winding the rotor with small-gauge wire so as to generate sufficient voltage to overcome brush contact voltage drop. Because of the many layers of conductor insulation required, the space factor of the apparatus is very poor. Thus, lower capacity units, such as a 2 H.P. and less, cannot be made within practical size limitations because of insufficient space to accommodate the size rotor necessary.

In accordance with the present invention, dynamoelectric apparatus is provided which provides variable speed A.C. motor operation over a wide range of rotor speeds (e.g., 50 r.p.m. to approximately 1800 r.p.m.) without the use of slip rings, brushes, commutators, etc. and which are compact and can be produced economically within practical size restrictions. Furthermore, such apparatus is provided which will create torque at zero speed, and has a rotor speed adjustable over a wide range and may be maintained within close tolerances at any preset value within that range under varying conditions of rotor loading. Moreover, this apparatus may also be used alternately as an A.C. generator or a brake.

Referring now more particularly to the drawings, one embodiment of dynamoelectric apparatus is indicated generally in FIG. 1 by reference character DE1, and comprises a first stator S1 including polyphase stator windings connected to a source of three-phase electric power such as indicated at L1, L2, L3, thereby to energize a pair of conventional stator poles. A second identical polyphase stator S2 positioned coaxially and spaced from S1 is connected to three electrical leads L4, L5, L6 adapted to be connected to an electrical load, such as a variable resistance (such as is shown in FIG. 6). Mounted coaxially within and surrounded by the annular stators S1 and S2, and journalled in end bearings B1 and B2, is a rotor assembly including a first rotor RT1, and a second rotor RT2 commonly mounted and spaced apart end-to-end on a rotor shaft RS1. Although the stators S1 and S2 follow conventional design for the usual squirrel-cage A.C. induction motors, these rotors differ in certain features. The core or form of each of these rotors is made up of conventional laminations, e.g., silicon steel, and there are longitudinal slots cut into the outer periphery of each of the rotors. A single conductor is disposed in each slot or groove, twelve such slots being illustrated in FIGS. 1 and 2. The conductors C1–C12, however, are insulated from the rotor laminations and are commonly connected at their left ends to a metal end plate EL. The right ends of conductors C1–C12 are terminated by welding or brazing, etc., to a similar end plate ER at the right end of rotor RT2. It will be noted that there is a transposition of the rotor conductors or bars between RT1 and RT2, as indicated by the connections of each respective conductor to the opposite end plates EL and ER, the points of connection of the conductors to EL being numbered clockwise (as viewed from the right end of the shaft RS) and the points of connection of the other ends of C1–C12 respectively being numbered or progressing counterclockwise. The purpose and significance of this transposition will be brought out hereinafter. It is preferred to support the conductors in the transposition area between the opposing ends of RT1 and RT2 by an insulating body of plastic molded or preformed.

The operation of the dynamoelectric apparatus can be generally analogized with two transformers T1 and T2 connected as indicated in FIG. 3. The primary winding TP1 of T1 is connected to a source of A.C. power as indicated at L1, L2, while the secondary TS1 is connected to the primary TP2 of transformer T2. The secondary TS2 is terminated by a rheostat R1 which functions as a variable electrical load. The power drawn from L1, L2 is a function of the magnetizing currents of T1 and T2 and the effective resistance of R1. The lower the resistance of R1 the greater the power demand on L1 and L2, while if R1 is disconnected or open-circuited the load on T1 is merely the magnetizing current of T2. The windings of stators S1 and S2 of my dynamoelectric apparatus are roughly comparable in electrical functioning to the input primary winding TP1 and the output or secondary winding TS2, while the interconnected windings of rotors RT1 and RT2 comprising transposed conductors C1–C12 are analogous to the loop-connected transformer windings TS1 and TP2. Thus, in each instance there is an electrical or inductive coupling between the input windings S1 (or TP1) to the windings RT1 and RT2 (or TS1 and TP2), and an inductive transfer of energy from RT2 (or TP2) to the output winding of stator S2 (or TS2).

More specifically, the operation of the apparatus of FIGS. 1 and 2 is initiated by the energization of the winding of stator S1 from A.C. power source L1–L3 which produces an electrical polyphase rotating field. This field induces voltages and the flow of current in the conductors of the tandem rotors RT1 and RT2, which in turn will rotate and produce a magnetic field which sweeps windings of stator S2, thereby inducing a voltage across output leads L4–L6. Where the windings of S2 are open-circuited (i.e., infinite resistance) the rotor will not drive shaft RS, the windings of rotor RT1 having a relatively high impedance under these conditions. At the lowest value of resistance (i.e., L4–L6 interconnected directly together with no resistance), the speed of the rotor rotation will be a maximum. The top seed of the apparatus is a function of the sum of the stator poles; thus a two-pole structure for each of the stators S1 and S2 (assuming a 60 c.p.s. power source L1–L3) provides a top speed approximating 1800 r.p.m. The transposition of the conductors C1–C12 in between rotors RT1 and RT2 makes the torques additive. For the relatively few instances where a higher speed is desired, a gear-head arrangement may be used. Four-pole stator structures at S1 and S2 would provide an output shaft speed approximating 850 r.p.m. The stators have a like number of poles, and S1 is usually wound for two or three phase, while S2 may be single, two or three phase, as desired.

The interrelationship of frequency and voltage output (assuming again a 60 c.p.s. A.C. power source at L1–L3) is indicated in FIG. 4. If a three-phase output winding S2 is utilized, it is to be understood that the resistance across each phase is always of equal magnitude. A convenient arrangement of delta-connected rheostats R1A, R1B, R1C shunted across three-phase windings S2A, S2B and S2C is illustrated in FIG. 6. The three rheostats are preferably mounted on a single shaft or otherwise ganged or mechanically linked for synchronous common rotational movement. There is, of course, the usual relationship between the physical load on shaft RS and the current drawn from L1–L3, full current being required for a full load. That is, a certain current represents a certain torque regardless of speed. It is also to be noted that the rotor circulating current, when S2 is open-circuited, will reduce to such a low value that the shaft RS will not rotate. As noted above, this is because the impedance of rotor RT2 is sufficiently high to reduce the over-all rotor current to very low values in this stator condition. This is desirable as it prevents the motor from running or developing torque when S2 is open or shunted by a very high resistance.

Inasmuch as a variation in physical load on shaft RS will change the rotational speed if the load resistance across the windings of stator S2 is held constant, a speed-control arrangement is desirable if the load to be driven by rotor DE1 is not substantially shown in FIG. 5. For simplicity, a single-phase winding is shown at S2. A rheostat R1A is serially connected by wires 21, 23 and 25 with the anode-cathode circuit of two back-to-back parallel-connected grid-controlled gas rectifiers or thyratrons V1 and V2 in a loop circuit with winding S2. Rheostat R1A is ganged as indicated to the shaft of a potentiometer R2, which serves as a speed setting potentiometer. A full-wave rectifier (constituted by a power transformer T3 connected to A.C. source L1, L2, two half-wave rectifier units Z1 and Z2, a dropping resistor R3, and a filter capacitor CP1) supplies a D.C. reference voltage to R2. The grid-cathode circuits of V1 and V2 are made responsive to a parameter of the voltage induced in S2 by RT2 by connecting the signal present across S2 (points X and Y) in a control loop including wires 23, 27, 29, a rectifier unit Z3, and resistors R4–R7. The parameter used for sensing speed of shaft RS in this embodiment is amplitude. Rectifier Z3, a filter capacitor CP2 and resistor R4 convert the A.C. signal developed across S2 into a D.C. potential developed across R8 which is an inverse function of the speed of shaft RS. To provide a rising voltage with speed, a counter-bias D.C. voltage is developed across R5 by another rectifier circuit (constituted by transformer T4, rectifier unit Z4, dropping resistor R9 and filter capacitor CP3) which is connected in bucking opposition thereto, as indicated by the respective polarities). An A.C. voltage constituting an out-of-shape rider wave is developed across R6 by means of a secondary of a quadrature wave transformer T5 and a capacitor CP4. The primary winding of T5 is connected (as indicated at X and Y) across S2. Thus the grid-cathode circuit of V1 has applied thereacross a composite D.C. potential (including an adjustable reference voltage across R2; a fixed D.C. counter-bias potential across R5; and a speed-responsive potential across R8) plus a phase-shifted A.C. rider wave (across R6). The A.C. anode-cathode potential for V1 (and V2) is supplied from S2 by wires 23 and 25. The grid-cathode circuit for V2 includes R1A across which is connected a half-wave rectifier unit Z5, a resistor R10 and a filter capacitor CP5. The D.C. potential developed across R10 (a function of the A.C. current passing through R1A and S2) is serially-connected in series opposition in the grid-cathode circuit of V2 with a second D.C. biasing potential across R11. This latter voltage is provided by a power transformer T6, a half-wave rectifier unit Z6 and a filter capacitor CP6. An A.C. phase-shifted rider wave is superimposed on this composite D.C. potential at R12 (by connecting it via a capacitor CP7 across another secondary winding of T5 as indicated at A and B).

The operation of this control unit effects a regulation of current through R1A (and S2) by automatically varying the conductivity periods of V1 and V2 which operate 180° out-of-phase passing this A.C. current. The composite A.C.-D.C. control voltages applied to the grid-cathode circuits of V1 and V2, as described above, govern the conductivity periods in response to the amplitude of the potential developed across S2 and the positioning of the speed-adjusting potentiometer R2 generally maintaining a governing or null-balance condition on the grid-cathode circuits. The circuit will control the speed of motor DE1 within quite close tolerances, e.g., within 40 r.p.m. with a load change from 0 to full load (2% speed regulation). A change in the preset speed is conveniently made simply by manual adjustment of the R2 potentiometer, and the control unit will maintain this new speed, any transient load deviations causing a change in the amplitude of the A.C. signal at X—Y which in turn modifies the bias on V1, V2 causing a corresponding change in firing periods, thus correcting the effective resistance across S2 and correcting any incipient speed change in rotor shaft RS.

It will be noted that the cathodes of V1 and V2 may be either directly or indirectly heated and would be energized in any of the customary manners known to those skilled in the art. Also, it will be understood that instead of a single-phase output as shown for S2 in FIG. 5 a polyphase arrangement could be used. However, the latter would require a duplication of the control circuitry shown for each phase and so the single-phase arrangement is illustrated for simplicity and economy.

A second embodiment of control circuitry of the dynamoelectric apparatus of this invention is illustrated in FIG. 7. This particular control is responsive to the frequency parameter of the S2 voltage signal and the variable resistive load as indicated at R1B is a direct-acting finger-type resistance controller, such as that manufactured and sold under the trade designation "Regohm" by the Electric Regulator Corporation of Norwalk, Connecticut. R1B is incorporated in an electromechanical servo system in which any incipient change (due to varying loads on shaft RS) in the frequency of the X1–Y1 signal voltage is reflected back through the balance of the control unit circuit to a pivoted armature AM which sequentially actuates the fingers of the resistance controller R1B to effect a compensating modification in the resistance connected across S2. More specifically, X1 and Y1 are interconnected as indicated to the input terminals of a frequency-sensitive bridge BR comprising two resistors R14 and R15 as two legs and two reactances (comprising an inductor CH and a capacitor CP8) as the other two legs. The output terminals of this bridge, OP1 and OP2, are respectively connected to two half-wave rectifier units Z7 and Z8. Thus, the A.C. potential developed across CH is rectified by Z7, filtered by a capacitor CP9 and applied across a speed-setting potentiometer R2A. Similarly, the A.C. potential developed across CP8 is rectified by Z8, filtered by a capacitor CP10 and applied across a speed-setting potentiometer R2B which is ganged with R2A for synchronous movement by a single shaft. The two rectifier sections described have a common connection at wire 31 which is connected as indicated to terminal Y1 of the winding of S2. The arms of R2A and R2B are connected by leads 33, 35 and 37 to the grid-cathode circuit of a gas-filled grid-controlled rectifier or thyratron V3. In addition to the algebraic sum of the R2A, R2B D.C. potentials, this grid-cathode circuit loop, including wires 33, 35 and 37 and a grid resistor R14, also includes two other potentials, one an A.C. rider wave developed across a resistor R15 and the other a D.C. biasing potential developed across a potentiometer R16. The latter is provided by a transformer T7 (the primary of which is connected to an A.C. line source, such as 115 v. A.C., as indicated at L1, L2) having a secondary winding connected to a half-wave rectifier circuit including a rectifier unit Z9 and a filter capacitor CP11. The A.C. out-of-phase rider wave potential is provided by a transformer T8, the primary winding of which is energized by an A.C. line source L1, L2, and the secondary of which is serially connected with a capacitor CP12 and R15.

The anode-cathode circuit of V3 includes an A.C. voltage source (the secondary of a transformer T9, the primary of which is connected to an A.C. line source L1, L2) and an armature arm-actuating signal coil SC. Associated with the armature AM is a pneumatic type dashpot DP including an adjusting valve VL and a piston P, linked resiliently to arm AM by a coupling spring CS. A reference spring RSP applies an opposing bias to arm AM.

The operation of this FIG. 7 control circuit upon a load change on shaft RS of the variable speed motor DE1 is as follows: Assuming the shaft RS is being driven at 1000 r.p.m. and its load is removed, there will be an incipient increase of the speed of RS. The resulting decrease in the frequency parameter of the voltage developed at X1–Y1 across the winding of stator S2 changes the relative effective impedances of CH and CP8 of bridge BR. The impedance of the former decreases with a frequency drop while the impedance of the latter increases with this drop in frequency. Thus, the potential across R2B increases relative to that developed across R2A, thereby making the grid of the thyratron V3 more positive relative to the cathode, and increases the conduction periods of V3 and the current flow through SC. The increased energization of SC pulls the left end of armature AM downwardly and actuates the contact fingers of R1B to sequentially open additional contacts, thereby increasing the resistance of R1B to counteract the incipient speed increase of RS.

A second structural embodiment of the dynamoelectric apparatus of the present invention is generally indicated at DE2 in FIG. 8. A first annular stator S1A is secured to the left end bell of a motor housing H, while a second annular stator S2A is affixed to the right end bell of the housing. Mounted coaxially and between S1A and S2A is a tandem rotor member RT1A and RT2A, keyed to a central shaft RS1, which is supported and journalled in bearings B3 and B4. The rotors RT1A and RT2A, as well as the stators, are formed from strips or narrow lengths of silicon steel wound concentrically like a spring with radial grooves or slots cut into the respective flat opposing faces of S1A, RT1A and RT2A, S2A.

As in the FIG. 1 embodiment, the opposite ends of the rotor conductors are terminated at end rings, but in FIG. 8 the end rings are cylindrical sections as indicated at ELA and ERA with their inner surfaces coaxial with respect to RS, rather than flat discs mounted in planes normal to the axis of the shaft. In both the FIG. 1 and FIGS. 8, 9 apparatus, there is a transposition of the rotor conductors between RT1A and RT2A. This FIGS. 8, 9 structure has the magnetic fields between S1A, RT1A and between RT2A, S2A generally axially aligned with the axis of shaft RSA, instead of in two sets of planes normal to the axis of rotation of the shaft as was the case in FIG. 1. The FIGS. 8, 9 embodiment has the advantage of having a shorter over-all length, as well as having the magnetic attractive force between S1A and RT1A balanced by the equal and opposite magnetic pull between RT2A and S2A.

The operation of this second embodiment is similar to that described above in regard to FIG. 1, and the speed control circuitry of FIGS. 5 and 7 will operate in the same manner with this FIGS. 8, 9 structure as described above with regard to that of FIG. 1.

Operation of the dynamoelectric apparatus as an A.C. generator is illustrated in FIG. 10. Instead of employing a polyphase winding for stator S1 and connecting it to a multiphase source of A.C. power, however, a single phase winding is used in the FIG. 10 embodiment and this winding is energized from a D.C. source of power as represented by a battery BA. The stationary D.C. field produced by D.C. source BA is adjusted by operation of a rheostat R17 interconnected with the winding of S1 and battery BA by leads D1 and D2. The shaft RS is driven by a motor M, thereby generating an A.C. potential and current flow in the windings or conductors of RT1 and RT2. The resulting rotating flux pattern cuts the winding of S2 and induces an A.C. potential which is applied by lines L7, L8 to an electrical load. The amplitude of the A.C. potential supplied to the load is a function of the D.C. voltage level as adjusted by R17 and applied to the windings of stator S1, while the frequency of this A.C. output developed by stator S2 is a function of the rotational speed at which shaft RS is driven by motor M. As indicated previously, the rotational speed of shaft RS depends on the sum of the poles of S1 and S2. Similarly, when operating as a generator the output frequency for DE1 as measured across the windings of S2 is 60 c.p.s. when RS is rotated at 1800 r.p.m., assuming two pole structures at S1 and at S2. This relationship is perhaps more graphically depicted in FIGS. 11 and 12 which illustrate the stationary stator flux field of S1 and the resulting induced magnetic flux field pattern of RT2 in a first position of rotor RS (FIG. 11) and in a second position (FIG. 12) with rotor shaft RS rotated physically about 60°. As shown in FIG. 12, the magnetic field of RT2 has rotated or been displaced 120°, or twice as much as the physical rotation of the rotor. It will be understood that if constant frequency output at S2 is desired then any of the conventional generator frequency control devices may be associated with DE1 and M to maintain the shaft speed at a fixed value.

The employment of the dynamoelectric apparatus DE1 as a brake is illustrated in FIG. 13 and is identical in its operation to the generator described above except that a manually adjustable load comprising three ganged rheostats R1A, R1B and R1C is connected across the windings of stator S2, which is a three- rather than a single-phase winding as shown in FIG. 10. The braking torque applied to motor M is a function of both the adjustment of R17 to vary the D.C. field of S1 and the setting of ganged rheostats R1A, R1B and R1C to vary the resistance across the windings of stator S2.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. Dynamoelectric apparatus comprising first stator windings adapted to be connected to a source of electrical power and thereby to energize at least one pair of poles, a rotor including a first set of conductors positioned for rotation within a magnetic field formed by said poles and a second set of conductors directly interconnected therewith and oppositely arranged relative to said first set of conductors, said second set of rotor conductors adapted to provide a rotating magnetic field, second stator windings with at least a second pair of poles adapted to be swept by said rotating magnetic field, and an electrical load interconnected with said second stator windings, said two magnetic fields being generally axially aligned with and parallel to the rotational axis of said rotor.

2. Apparatus as set forth in claim 1 in which said first and second stator windings are spaced apart along the axis of rotation of said rotor.

3. Apparatus as set forth in claim 2 in which said first and second sets of rotor conductors are spaced apart along the axis of rotation of said rotor.

4. Apparatus as set forth in claim 3 in which the first stator winding, first and second sets of rotor conductors, and said second stator windings are positioned in that order and respectively spaced apart along and coaxial with the axis of rotation of said rotor.

5. Apparatus as set forth in claim 4 in which each of said stator windings and sets of rotor conductors has a separate annular core of concentrically wound strip of magnetic material associated respectively therewith, said annular cores being of substantially the equal diameters and spaced apart and coaxial with the axis of rotation of said rotor.

6. A variable speed electric motor comprising first stator windings adapted to be connected to a source of A.C. power and thereby to energize at least one pair of poles, a rotor including a first set of conductors positioned for rotation within a magnetic field formed by said poles and a second set of conductors directly interconnected therewith and oppositely arranged relative to said first set of conductors, said second pair of rotor conductors adapted to provide a rotating magnetic field, second stator windings with at least a second pair of poles adapted to be swept by said rotating magnetic field, adjustable resistance means interconnected with said second stator windings whereby upon adjustment of said resistance means the rotational speed of said rotor may be varied, control means responsive to a parameter of the voltage induced in said second stator windings to vary the resistance of said resistance means whereby the rotational speed of said rotor may be maintained at a predetermined value under varying conditions of motor loading.

7. A motor as set forth in claim 6 in which said first and second stator windings are spaced apart along the axis of rotation of said rotor.

8. A motor as set forth in claim 7 in which said first and second sets of rotor conductors are spaced apart along the axis of rotation of said rotor.

9. A motor as set forth in claim 6 in which the two magnetic fields are generally in two sets of planes normal to the axis of rotor rotation and spaced apart along the axis of rotation of said rotor.

10. A motor as set forth in claim 6 in which the two magnetic fields are generally axially aligned with and parallel to the rotational axis of said rotor.

11. A motor as set forth in claim 7 in which the first and second stator windings are outside and peripherally surround respectively the first and second sets of rotor conductors.

12. A motor as set forth in claim 11 in which the first stator winding, first and second sets of rotor conductors, and said second stator windings are positioned in that order and respectively spaced apart along and coaxial with the axis of rotation of said rotor.

13. A motor as set forth in claim 6 in which said control means includes a frequency sensitive bridge and a mechanically actuated variable resistor and said bridge is responsive to variation in the frequency parameter of the voltage induced in said second stator windings.

14. A motor as set forth in claim 6 in which said control means includes a grid-controlled gas rectifier responsive to variation in the amplitude parameter of the voltage induced in said second stator windings.

15. Dynamoelectric brake apparatus comprising first stator windings adapted to be connected to an adjustable source of D.C. power and thereby to energize a pair of poles, a rotor including a first set of conductors positioned for rotation within a magnetic field formed by said poles and a second set of conductors directly interconnected therewith and oppositely arranged relative to said first set of conductors, said second pair of rotor conductors adapted to provide a rotating magnetic field, second stator windings with at least a second pair of poles adapted to be swept by said rotating magnetic field, means for driving said rotor, and an adjustable resistor interconnected with said second stator windings whereby adjustment of said resistor varies the braking action on said rotor-driving means.

References Cited in the file of this patent

UNITED STATES PATENTS

| | | |
|---|---|---|
| 438,602 | Bradley | Oct. 21, 1890 |
| 464,671 | Blathy | Dec. 8, 1891 |
| 1,614,008 | Martinett | Jan. 10, 1927 |
| 1,624,464 | Hobart | May 10, 1927 |
| 2,444,077 | Weathers | Jan. 29, 1948 |